Aug. 16, 1949. S. ALTAMORE Re. 23,141

RECIRCULATING SYSTEM FOR GAS FIRED OVENS

Original Filed Oct. 22, 1943 3 Sheets-Sheet 1

Inventor

SEBASTIAN ALTAMORE

By

Mock & Blum

Attorneys

RECIRCULATING SYSTEM FOR GAS FIRED OVENS

Original Filed Oct. 22, 1943 3 Sheets-Sheet 2

Inventor
SEBASTIAN ALTAMORE

By Mock & Blum
Attorneys

RECIRCULATING SYSTEM FOR GAS FIRED OVENS

Original Filed Oct. 22, 1943 3 Sheets-Sheet 3

Inventor

SEBASTIAN ALTAMORE

By Mock & Blum

Attorneys

Reissued Aug. 16, 1949

Re. 23,141

UNITED STATES PATENT OFFICE 23,141

RECIRCULATING SYSTEM FOR GAS FIRED OVENS

Sebastian Altamore, Maspeth, N. Y.

Original No. 2,369,706, dated February 20, 1945, Serial No. 507,347, October 22, 1943. Application for reissue February 20, 1946, Serial No. 648,948

7 Claims. (Cl. 263—8)

This invention relates to new and useful improvements in recirculating systems for ovens in which work is heated.

The principal object of the present invention is to provide a special recirculating system for heating ovens wherein the heat is equally distributed across the work.

Another important object of the invention is to provide a special recirculating unit for heating ovens which will serve to recirculate heated air in a circular motion across the oven.

Other objects and advantages of the invention will become apparent to the reader of the following description.

Figure 1:
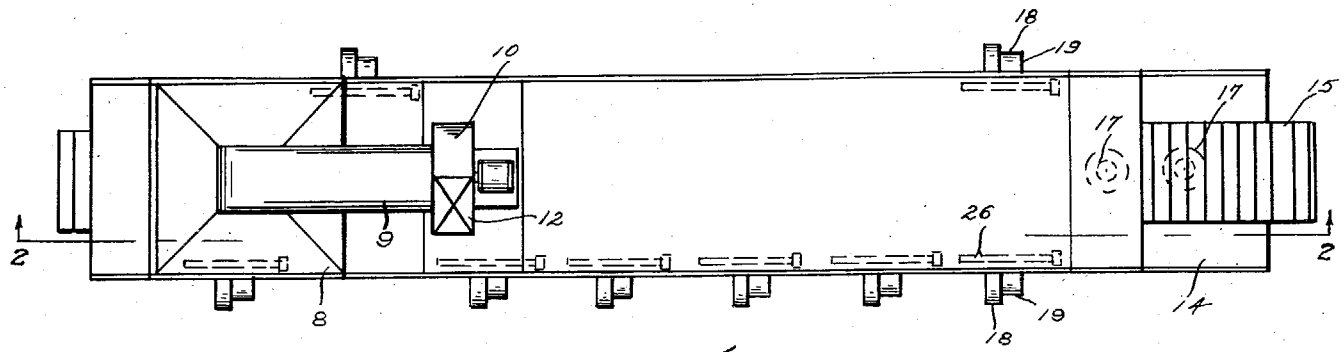
Figure 1 is a top plan view of the improved oven.

Referring to the drawings wherein like numerals designate like parts, it can be seen that numeral 5 denotes an oven shell open at its end 6 and provided with a sloping end wall 7 at its opposite end. At the latter end of the shell 5, the top has a hood 8 from which extends a conduit 9 to a suction-blower 10 driven by an electric motor 11 and from the outlet side of which rises a stack 12. Just under the hood 8 and within the shell 5 is a baffle plate 13.

Figure 2:
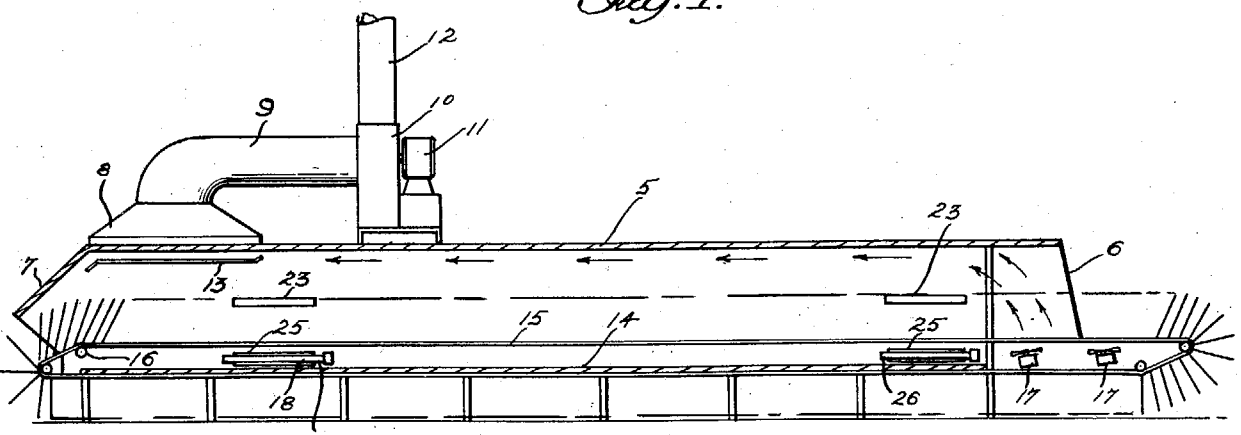
Figure 2 is a fragmentary vertical longitudinal view through the oven.

Numeral 14 denotes a floor for the shell 5 over which travels the upper flight of an endless conveyer 15, the lower flight of which passes under the floor 14, and it will be observed in Figure 2, that the conveyor belt passes over suitable rollers or the like 16.

Cooling fans 17 (motor driven) are located within the end 6 of the oven and this fan-means supplies cool air that travels just under the top of the shell 5 and is drawn to the opposite end of the shell 5 by the suction blower 10 acting through the hood 8.

Figure 4:
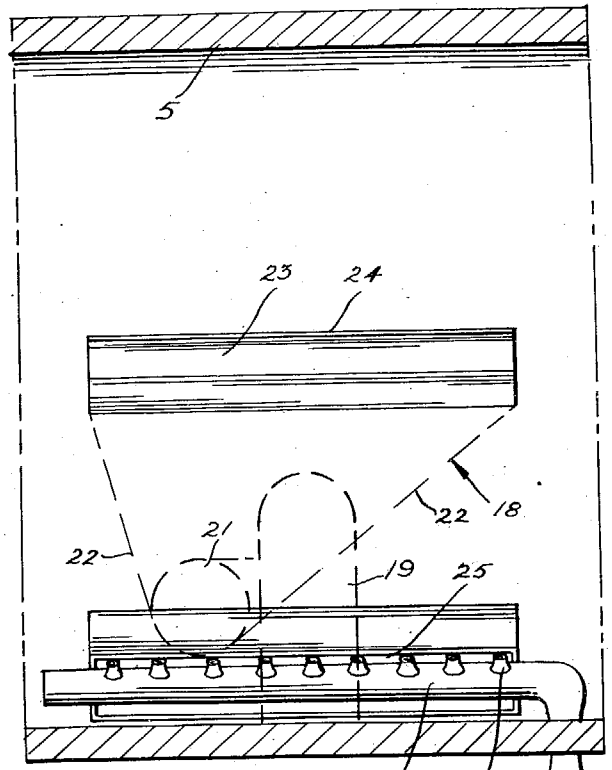
Figure 4 is an inside elevational view of the unit shown in Figure 3.
Figure 3:
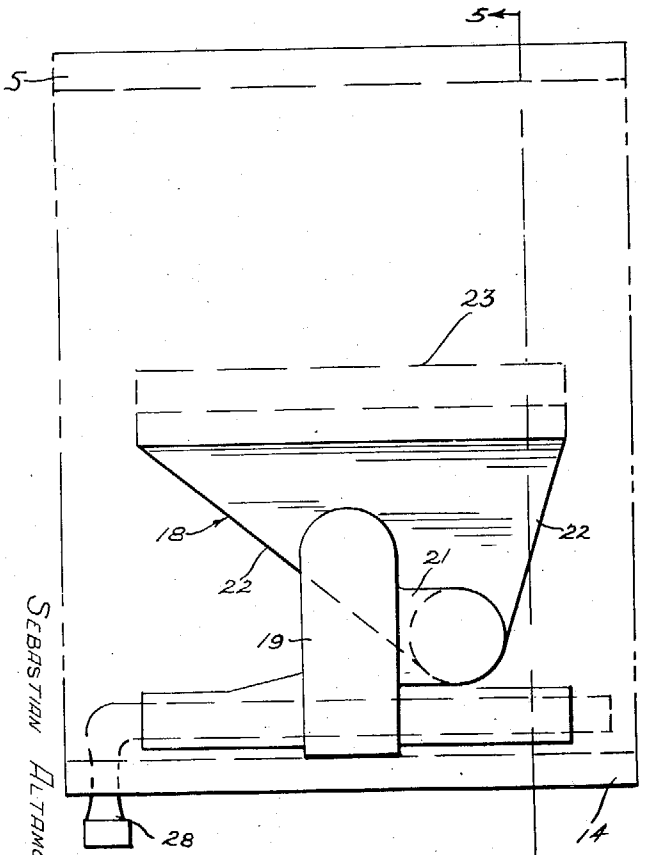
Figure 3 is an outside elevational view of one of the recirculating units shown in relation to a section of the oven shell.
Figure 5:
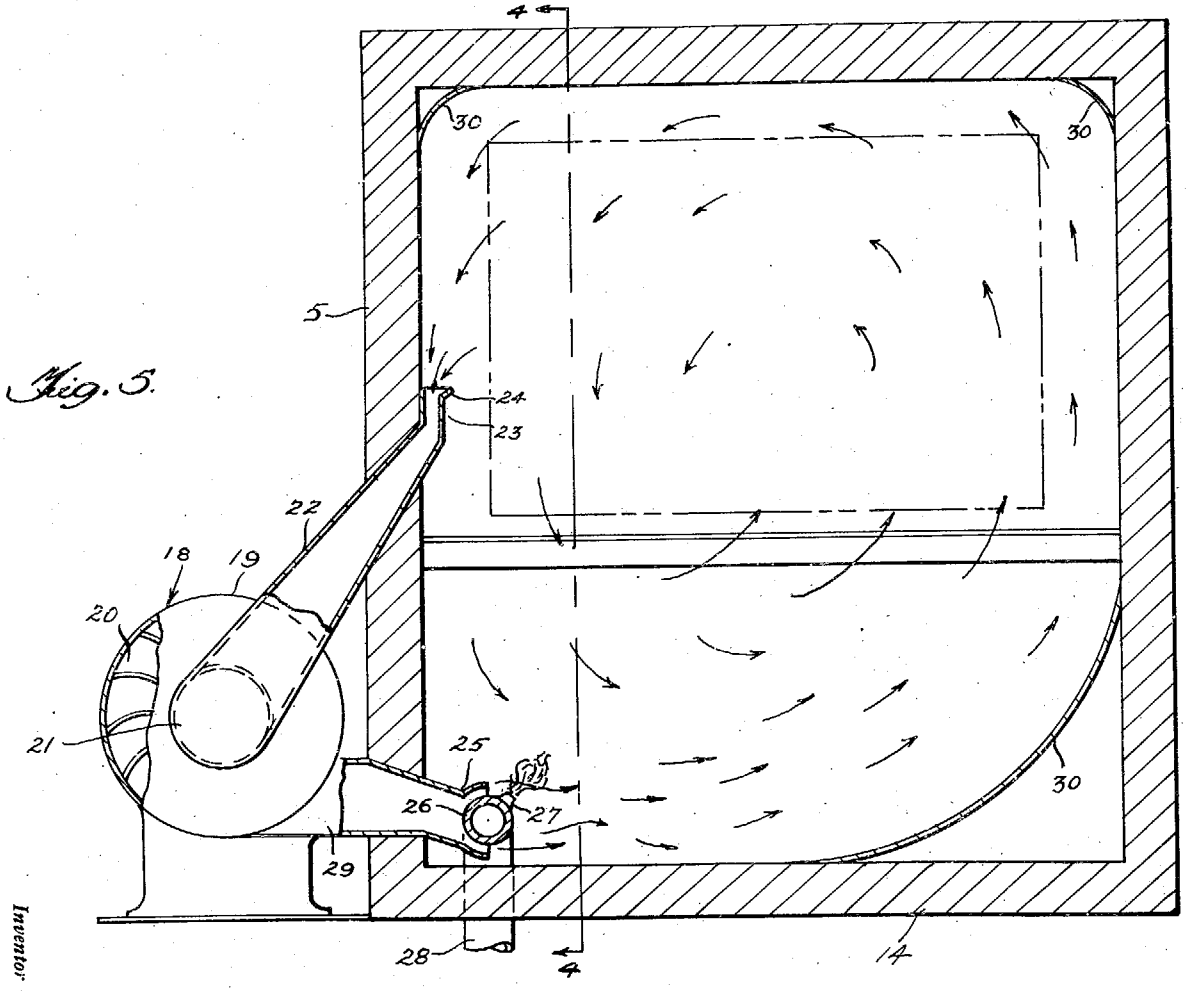
Figure 5 is an enlarged detailed sectional view taken substantially on the line 5—5 of Figure 3.

The conveyer 15 carries work through the oven and in the path of circular activities of the air set up by heating and recirculating units each of which is denoted generally by numeral 18. This particular unit is shown clearly in Figures 3, 4 and 5.

Each unit 18 consists of a suction blower consisting of a housing 19 in which a fan 20 operates and from the axial portion of this housing 19, that is, the intake side, an elbow 21 extends and connects to the narrow lower portion of a substantially fan-shaped upwardly tapering conduit 22 which passes through the adjacent side wall of the oven shell 5 and terminates in a narrow elongated mouth 23, one edge of which is bent outwardly to define a deflector lip 24. The mouth 23 is disposed vertically as clearly shown in Figure 5.

Through the lower portion of the same side wall of the shell 5 and for the same unit 18 an elongated mouth 25 is provided and half of said mouth spacially envelops a gas burner 26 having a plurality of jets 27 and which has a fuel supply pipe 28. A flared conduit 29 connects the mouth 25 with the exhaust or outlet side of the suction blower fan 20 of this unit 18.

It can now be seen, that when the units 18 are functioning, and the burners 26 thereof are in operation, the blower fans 20 of these units will force the intake gases across the burners 26, thus heating the air and other intake gases. The interior of the oven shell 5 has curved baffle plates 30 in the corners thereof to assist in causing a turbulent action of the heated air and other gases as they pass in circulation out of the mouth 25 through and against the work located on the conveyer 15 and which are then sucked back in the unit 18 by way of the mouth 23 and conduit 22.

This air is recirculated time and again, each time being reheated.

As shown in Fig. 2, the intake or inlet mouths 23 are located above the conveyer 15. The broken rectangular figure in Fig. 5 indicates one of the work-pieces.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A recirculating system for heating ovens comprising an elongated shell having an open inlet end, a unit at one side of the shell, said unit including a suction blower device, a suction mouth located within the shell and being in communication with the intake side of the suction blower device, an outlet mouth located within the lower portion of the oven and being in communication with the exhaust side of the suction blower device, and heating means within the last-mentioned mouth, and means for circulating cool air, longitudinally through the oven at the upper portion thereof comprising blowers at said open end of the shell and at the bottom thereof, and a forced draft air evacuating unit at the other end of the shell on top thereof.

2. An oven which has a support for the work which is to be heated, said oven having an oven-opening, said oven also having an oven gas outlet which is located above said oven-opening and said support, said oven gas outlet being also longitudinally spaced from said oven-opening in a horizontal direction, gas-injection means associated with said oven-opening and operative to inject gas upwardly into said oven above said support at said oven-opening and longitudinally towards said oven gas outlet above said support, said injected gas being free to travel inwardly in said oven above said support towards said oven gas outlet, a gas-circulating device, said device having a gas-circulating inlet in said oven and a gas-circulating outlet in said oven and a heater and gas-circulating means to draw in gas at said gas-circulating inlet and to discharge gas through said gas-circulating outlet, said gas-circulating inlet being located above said support and said gas-circulating outlet and below said oven gas outlet, said gas-circulating inlet and said gas-circulating outlet being located intermediate said oven-opening and said oven gas outlet in a horizontal direction, said gas-circulating inlet and said gas-circulating outlet being connected to said oven in a direction which is lateral to said horizontal direction to draw and to discharge gas in a direction which is lateral to said horizontal direction.

3. An oven according to claim 2 in which said gas-circulating inlet is located substantially directly above said gas-circulating outlet.

4. In combination, an oven which has a longitudinal axis, said oven having an air-inlet end at one end of said oven, said oven having another open end at the other end of said oven, conveyer means for conveying work-pieces through said oven, said conveyer means being spaced vertically from the top and bottom of said oven, air-propelling means located at said air-inlet end and adapted to force a current of air into said oven at said air-inlet end and through said oven and above said conveyer means towards said other end of said oven, a forced-draught evacuating unit which has an inlet port which communicates with said oven at the top of said oven at said other end, said unit being adapted and constructed to withdraw gases laterally from said oven at said inlet port, and an air-circulating device external to said oven and located at a side of said oven, said air-circulating device having an inlet pipe which has an inlet mouth which is located in said oven below the top of said oven in the path of said current of air, said air-circulating device having an outlet pipe which has an outlet mouth which is located in said oven below said conveyer means, and a heater located in said oven at said outlet mouth, said oven being closed between said ends save at said port.

5. A combination according to claim 4, in which said heater is an unshielded burner which has burner-jets which are located directly at said outlet mouth.

6. An oven which has a longitudinal axis, said oven having longitudinally alined oven-inlet and oven-outlet openings, a longitudinally movable and endless conveyor which has a longitudinal run which passes through said oven-inlet and oven-outlet openings, air-propelling means located at said oven-inlet opening, said air-propelling means being disposed and operative to produce a current of air which is upwardly directed at said oven-inlet opening and which moves longitudinally from said oven-inlet opening in a longitudinal path above said conveyor towards said oven-outlet opening, a suction device connected to said oven-outlet opening, a lateral gas-circulating device located longitudinally between said oven-inlet opening and said oven-outlet opening, said gas circulating device having a gas inlet which communicates with said oven above said run and having a gas outlet which communicates with said oven below said run, said gas inlet and said gas outlet being substantially superposed, said gas-circulating device having means to force gas through said gas-circulating device, said gas-circulating device having a heater to heat the gas which is circulated through said gas-circulating device.

7. An oven according to claim 6, said oven having a baffle at said outlet, said baffle being shaped to upwardly deflect the gas which issues from said outlet.

SEBASTIAN ALTAMORE.

REFERENCES CITED

The following references are of record in the file of this patent:

UNITED STATES PATENTS

| Number | Name | Date |
|---|---|---|
| 2,129,634 | Albright | Sept. 13, 1938 |
| 2,230,800 | Hormel | Feb. 4, 1941 |